(12) United States Patent
Röttger et al.

(10) Patent No.: US 9,616,832 B2
(45) Date of Patent: Apr. 11, 2017

(54) BUMPER SYSTEM FOR A VEHICLE

(71) Applicants: Thyssenkrupp Steel Europe AG, Duisburg (DE); THYSSENKRUPP AG, Essen (DE)

(72) Inventors: Rolf Peter Röttger, Mülheim/Ruhr (DE); Martin Kibben, Dinslaken (DE); Markus Zörnack, Attendorn (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 14/752,224

(22) Filed: Jun. 26, 2015

(65) Prior Publication Data
US 2015/0375701 A1 Dec. 31, 2015

(30) Foreign Application Priority Data

Jun. 27, 2014 (DE) .......................... 10 2014 009 337

(51) Int. Cl.
*B60R 19/02* (2006.01)
*B60R 19/18* (2006.01)

(52) U.S. Cl.
CPC ...... *B60R 19/18* (2013.01); *B60R 2019/1813* (2013.01); *B60R 2019/1826* (2013.01)

(58) Field of Classification Search
CPC ................................. B60R 19/18; B60R 19/22
USPC ........................................ 293/102, 121, 120
See application file for complete search history.

(56) References Cited

U.S. PATENT DOCUMENTS

| 7,448,658 | B2* | 11/2008 | Takagi | B60R 19/18 293/102 |
| 7,611,175 | B2* | 11/2009 | Tornberg | B60R 19/18 293/102 |
| 9,114,768 | B2* | 8/2015 | Taniguchi | B60R 19/18 |
| 2006/0061111 | A1* | 3/2006 | Ignafol | B60R 19/18 293/102 |

FOREIGN PATENT DOCUMENTS

| DE | 102011113473 | * | 3/2013 | ............. B60R 19/18 |
| FR | 2832110 | * | 11/2001 | |

* cited by examiner

*Primary Examiner* — Dennis H Pedder
(74) *Attorney, Agent, or Firm* — Lathrop & Gage L.L.P.

(57) ABSTRACT

One bumper system for a vehicle includes a bumper bracket and a deformation element connected to the bumper bracket. The bumper bracket is composed of a metallic workpiece with an undulating form such that the bumper bracket has at least one undulation trough and at least two undulation peaks, and reinforcement zones are formed in regions of the undulation trough. Another bumper system for a vehicle includes a bumper bracket and a deformation element connected to the bumper bracket. The bumper bracket has an undulating form such that the bumper bracket has a plurality of undulation troughs and a plurality of undulation peaks, and reinforcement zones are formed in each undulation trough. In each system, a second deformation element may be connected to the bumper bracket, and at least one characteristic of the reinforcement zones may increase or decrease between the deformation elements and a middle of the bumper bracket.

20 Claims, 2 Drawing Sheets

BUMPER SYSTEM FOR A VEHICLE

RELATED APPLICATIONS

This application is a continuation of German Patent Application 102014009337.9, filed Jun. 27, 2014, the disclosure of which is incorporated herein by reference.

BACKGROUND

Bumper systems, in particular in the front-end structure in a motor vehicle, must satisfy high demands with regard to the safety of vehicle occupants and also with regard to weight and ease of exchange in the event of damage. In the event of a front-end collision, it is possible, by means of targeted deformation of the bumper brackets and of the deformation elements, which are preferably in the form of so-called crash boxes and which are preferably arranged between the bumper brackets and longitudinal beams of a vehicle, for the impact energy to be absorbed by plastic deformation and for the vehicle to be significantly decelerated before further, in particular load-bearing structures such as, for example, longitudinal beams contribute to the further absorption of energy. Furthermore, the bumper brackets have the task, in the case of low impact speeds, of protecting load-bearing vehicle structures and vehicle assemblies, such as for example radiator and engine, against damage. Furthermore, it is an aim in automobile construction to reduce vehicle weight in order to reduce $CO_2$ emissions. Generic bumper systems are known from the prior art.

US 2004/0256867 discloses a bumper system for a motor vehicle which has a bumper bracket composed of a metallic workpiece with an undulating cross section, wherein the undulating form is such that the bumper bracket has two undulation troughs and three undulation peaks. In order, in the event of a front-end collision, to prevent the bumper bracket from spreading or flaring in the transverse direction, the teaching proposes the provision of additional reinforcement bands which, running substantially diagonally, are connected cohesively to the bumper bracket in the region of the undulation peaks oriented in the vehicle direction (x direction). Furthermore, the bumper system comprises multiple deformation elements (crush boxes) which are connected to the bumper bracket. The construction of the bumper system is highly complex, and owing to the use of additional elements, a weight saving is not possible.

It may be desirable to have a bumper system with a simple construction in relation to the prior art while at the same time having a reduced mass and satisfying the demands placed on it in the event of a collision.

SUMMARY

The following presents a simplified summary in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a bumper system for a vehicle includes a bumper bracket and a deformation element connected to the bumper bracket. The bumper bracket is composed of a metallic workpiece with an undulating form such that the bumper bracket has at least one undulation trough and at least two undulation peaks, and reinforcement zones are formed in regions of the undulation trough.

In another embodiment, a bumper system for a vehicle includes a bumper bracket and a deformation element connected to the bumper bracket. The bumper bracket has an undulating form such that the bumper bracket has a plurality of undulation troughs and a plurality of undulation peaks, and reinforcement zones are formed in each undulation trough.

DETAILED DESCRIPTION

Figure 1:
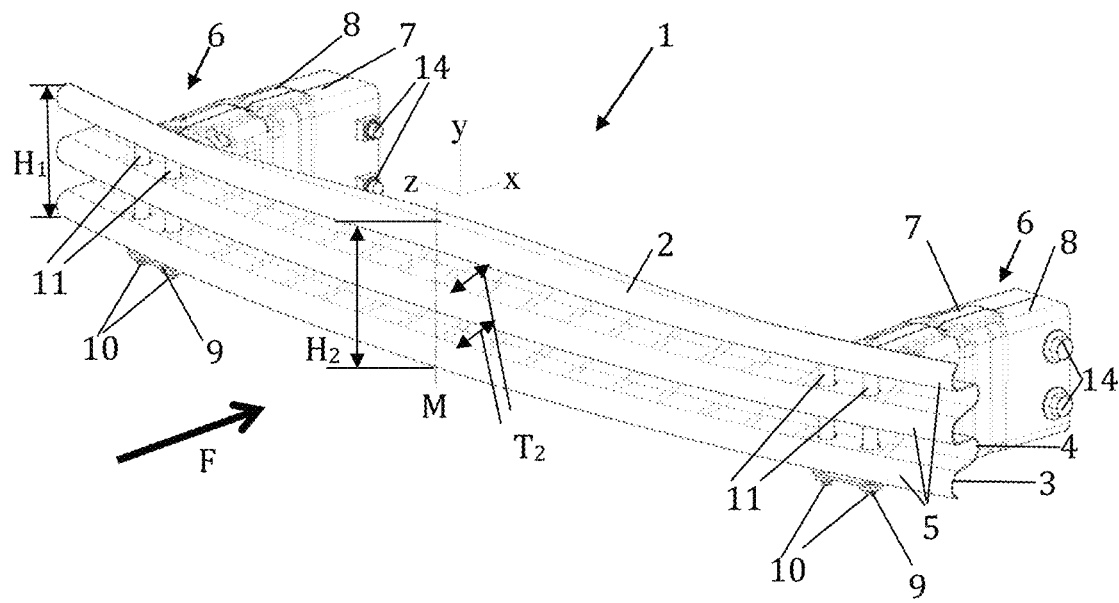
FIG. 1 shows an exemplary embodiment of a bumper system for a vehicle, in a perspective view.

In various embodiment of the current invention, reinforcement (or "stiffening") zones for a bumper system are formed at least in regions of an undulation trough.

By means of a balanced structural design of a bumper bracket with an undulating main structure, the overall system can be improved in that, through the introduction or provision of stiffening (or "reinforcement") zones which are arranged at least in regions, for example in the form of embossments/stamped portions or beads, in an undulation trough and which are oriented counter to a vehicle direction (x direction), the flexural rigidity of the bumper bracket about the vehicle transverse axis can be increased, and spreading or flaring of the bumper bracket in the transverse direction owing to an introduction of force in the event of a front-end collision can be substantially prevented, in particular while dispensing with additional reinforcement elements, closure panels or the like.

The reinforcement zones may vary in terms of size, embossment/stamping, spacing, number and/or distribution, inter alia in order to set the optimum characteristics, in particular in order to reduce intrusion in the event of a collision. In one refinement of the invention, the stiffening zones may increase or decrease in terms of their protuberance depth and/or protuberance length from the end region of the bumper bracket or from the connection region to the deformation element toward the middle of the vehicle, whereby the intrusion characteristics can be set in targeted fashion. Also, the form of the stiffening zones may change or vary along the bumper bracket toward the middle of the vehicle. The protuberance depth of the reinforcement zones may correspond in particular to 0.5 to 4 times the material thickness of the bumper bracket, and it may be desirable for the protuberance depth to be 1 to 3 times the material thickness of the bumper bracket. The reinforcement zones may also be formed in at least one undulation peak. The reinforcement zones may also preferably be formed regionally in the adjacent region (flank) of the undulation trough and/or undulation peak in order to further increase the flexural rigidity of the bumper bracket about the vehicle transverse axis. The necessary parameters can nowadays be easily determined by way of crash simulation programs. Depending on the vehicle, it may be provided in one preferred refinement of the invention that the stiffening zones are arranged equidistantly along the bumper bracket. The bumper system according to the invention may thus satisfy the collision requirements with regard to the "EURO NCAP ODB" load situation at 64 km/h and the insurance category test "AZT" at 15 km/h.

For further optimization of the intrusion characteristics, it may be provided in a further refinement of the invention that the distance between the undulation peak and the undulation trough in the undulating main structure of the bumper bracket increases, in particular in continuous fashion, toward the middle of the vehicle. In this way, it is advantageously possible to realize a high resistance to bending and buckling at the impact point in the middle of the vehicle, in particular in combination with a bumper bracket which is preferably arched in the vehicle direction (x direction) and of symmetrical form.

In a further refinement of the invention, it may be provided that the height (y direction) of the bumper bracket increases, in particular in continuous fashion, toward the middle of the vehicle and is symmetrical. In the event of a front-end collision in particular with a taller vehicle, for example with an SUV, the impact occurs above the deformation element or crash box central plane in the case of a conventional motor vehicle, whereby an additional load moment in the y direction is generated. Owing to the fact that the bumper bracket is of taller form in the middle of the vehicle than in the end regions thereof or in the connecting regions thereof to the deformation elements, it is advantageously possible for the additional load moment to be compensated. In this way, it may also be possible for the requirements in accordance with the "RCAR Bumper Test" load situation at 10 km/h to be satisfied.

A further refinement of the invention provides that the bumper bracket is composed of a super-high-strength steel material, preferably with a tensile strength of greater than 980 MPa. Aside from cold-workable steel materials, such as for example iron-manganese steels or dual-phase steels, use may also be made of hot-forming steels, such as for example manganese-boron steels, which are of monolithic form or which are arranged as at least one metallic layer within a multi-layered composite material. For a predefined intrusion characteristic, the hot-forming steel, while having a similar resistivity, has the advantage that, owing to the greater tensile strength of at least 1500 MPa in the press-hardened state, the material thickness, and in association therewith the mass, can be reduced in relation to the cold-forming steel.

In a further refinement of the invention, it is advantageously possible for the mass of the bumper system to be further reduced through the use of a flexibly rolled steel material, also referred to as "tailored rolled blank", as material for the bumper bracket and/or the deformation element. The bumper bracket is preferably composed of a flexibly rolled hot-forming steel, wherein a greater distance between the undulation peak and the undulation trough and/or a greater protuberance depth of the stiffening zone is targetedly provided in the regions of relatively small material thickness than in the regions of relatively large material thickness, in order to provide at least a constant resistivity along the entire length of the bumper bracket.

It is also additionally or alternatively provided in further refinements that the bumper system according to the invention is arranged or provided in the vehicle rear-end structure, in order to make it possible to targetedly set an optimum intrusion characteristic in the direction of the passenger cell in the event of a rear-end collision.

Reference is now made to the accompanying figures for additional description. FIG. 1 shows a bumper system (1) according to an embodiment of the invention in a perspective view. The bumper system (1) has at least one bumper bracket (2) composed of a metallic material. It may be desirable for the bumper bracket (2) to be composed of a high-strength steel material (e.g., hot-formed steel, press-hardened steel, etc.), and the bumper bracket (2) has an undulating form (3). The undulating form (3) is such that the bumper bracket (2) has at least one (in the embodiment of FIG. 1, two) undulation troughs (4) and at least two (in the embodiment of FIG. 1, three) undulation peaks (5).

Furthermore, on left-hand and right-hand sides of the bumper bracket (2), there are deformation elements (6) which can be connected by way of a preferably detachable screw connection (14) to longitudinal beams (not illustrated) of a vehicle body. Each deformation element (6) may for example be assembled from at least two half-shells (7, 8), which are preferably formed from a steel material and which are butt-welded to one another to form a closed profile for example by laser welding.

For connection to the bumper bracket (2), means are provided which comprise, for example, a connection plate (9) for the preferably detachable, non-positively locking connection of the deformation element (6) to the bumper bracket (2) by means of screws (10), and spacer sleeves (11) which are led through corresponding holes (12) in the bumper bracket (2) and which serve for receiving the screws (10). By means of the detachable connection, the bumper bracket (2) can advantageously be easily exchanged in the event of damage. Alternatively, the deformation elements (6) may also be connected non-detachably to the bumper bracket (2) in cohesive fashion, preferably by welding, wherein the deformation elements (6) are then connected, preferably detachably screwed, to the longitudinal beam via impact plates which are provided both at the longitudinal beam side and at the deformation element side.

Figure 2:
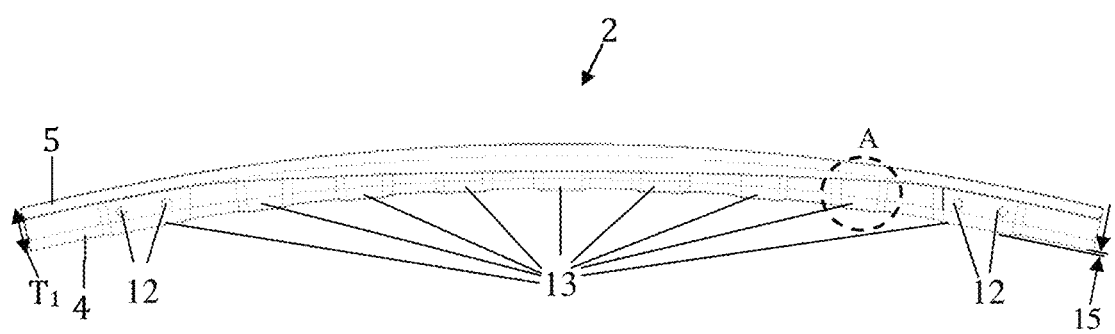
FIG. 2 shows the bumper bracket from FIG. 1, in a plan view.
Figure 3:
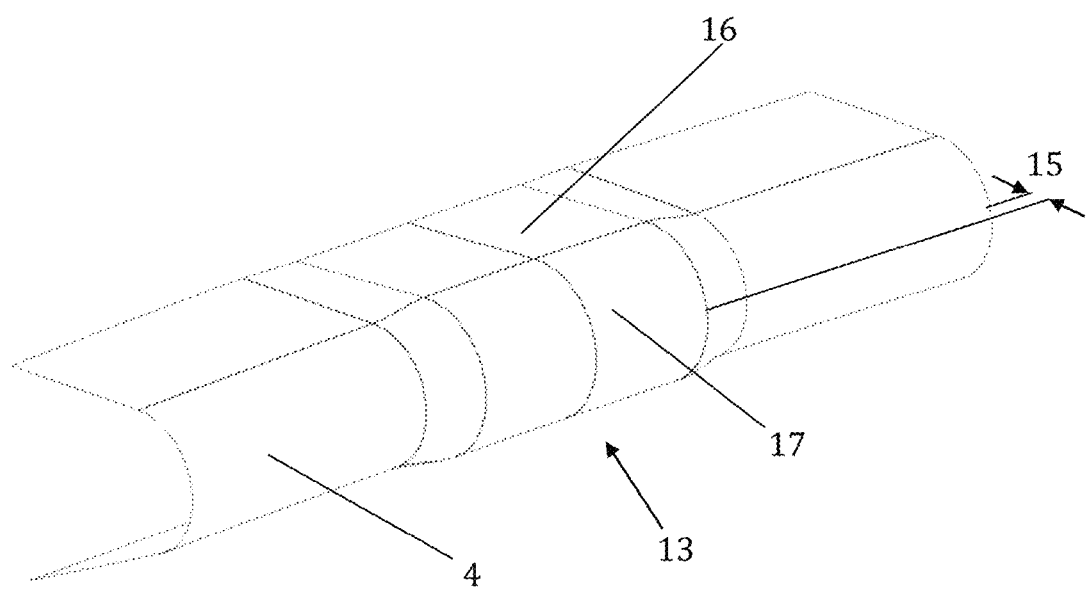
FIG. 3 shows an enlarged detail from area A of FIG. 2, in a perspective view.

The bumper system (1) may include stiffening zones (13) which are arranged at least in regions, for example in the form of embossments/stamped portions or beads, in the undulation troughs (4) and which are oriented counter to the vehicle direction (x direction). The flexural rigidity of the bumper bracket (2) about the vehicle transverse axis can thus be increased, and spreading or flaring of the bumper bracket (2) in the transverse direction owing to an introduction of force (F) in the event of a front-end collision can be substantially prevented, in particular while dispensing with additional reinforcement elements, closure panels or the like. The reinforcement zones (13) may preferably be arranged equidistantly, as shown in FIG. 2. A protuberance depth (15) of the reinforcement zones (13) may preferably correspond to 1 to 3 times the material thickness of the bumper bracket (2). The reinforcement zones (13) are not only formed in regions in the undulation trough (4), but may also preferably be formed in the adjoining region (or "flanks") (16), wherein the protuberance of the reinforcement zone (13) merges for example from an elevated circular section (17) into the adjoining region (16), and tapers off with increasing distance from the undulation trough (4) toward the middle, between the undulation trough (4) and the undulation peak (5) (FIG. 3). It can be achieved in this way that, in the flanks (16), too, the flexural rigidity of the bumper bracket (2) about the vehicle transverse axis (y direction) can be increased in order to substantially prevent spreading or flaring of the bumper bracket (2) in the flanks (16). To realize high resistance to bending and buckling at the impact point in the middle (M) of the bumper bracket (2), the distance (T) between the undulation peak (5) and the undulation trough (4) in the undulating main structure (3) of the bumper bracket (2) may increase ($T_2 > T_1$), in particular in continuous fashion, toward the middle (M), wherein the bumper bracket (2) is preferably arched in the vehicle direction (x direction), in particular in order to realize a further increase in flexural rigidity, and is of symmetrical form.

The bumper bracket (2) may preferably be configured such that its height (H) increases ($H_2 > H_1$), in particular in continuous fashion, in the direction of the middle (M) and is symmetrical, in order to ensure that, in the event of a front-end collision force (F) from a taller vehicle, the taller form of the bumper bracket ($H_2$) in the middle (M) in relation to its end regions ($H_1$) or connection regions to the deformation elements advantageously has the effect that a possible additionally occurring load moment in the y direction, which would result in a high level of intrusion in the vehicle direction, can be substantially compensated in combination with the reinforcement zones (13).

Mass may be further reduced by virtue of the flexural beam being composed preferably of a press-hardenable steel material and/or by the half-shells which are assembled to form a deformation element being composed of a flexibly rolled material.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

We claim:

1. A bumper system for a vehicle, comprising:
a bumper bracket composed of a metallic workpiece with an undulating cross-section such that the bumper bracket has at least one undulation trough and at least two undulation peaks; and
a deformation element connected to the bumper bracket; wherein reinforcement zones are formed in regions of the undulation trough and the reinforcement zones are in the form of increased thickness of metallic material of a cross section of the trough.

2. The bumper system of claim 1, wherein each reinforcement zone includes a protuberance and wherein at least one of a protuberance depth and a protuberance length increases or decreases from an end region of the bumper bracket toward a middle of the bumper bracket.

3. The bumper system of claim 1, further comprising a second deformation element connected to the bumper bracket, wherein each reinforcement zone includes a protuberance and wherein at least one of a protuberance depth and a protuberance length increases or decreases between the deformation elements and a middle of the bumper bracket.

4. The bumper system of claim 3, wherein the protuberance depth corresponds to 0.5 to 4 times a material thickness of the bumper bracket.

5. The bumper system of claim 3, wherein the reinforcement zones are arranged equidistantly along the bumper bracket.

6. The bumper system of claim 5, wherein the deformation element is detachably connected to the bumper bracket.

7. The bumper system of claim 5, wherein the deformation element is welded to the bumper bracket.

8. The bumper system of claim 5, wherein:
a distance between a respective undulation peak and a respective undulation trough continuously increases toward the middle of the bumper bracket;
the bumper bracket is arched in a vehicle direction; and
the bumper bracket is symmetrical about the middle of the bumper bracket.

9. The bumper system of claim 8, wherein a height of the bumper bracket continuously increases toward the middle of the bumper bracket.

10. The bumper system of claim 1, wherein a height of the bumper bracket continuously increases toward a middle of the bumper bracket and is symmetrical.

11. The bumper system of claim 1, wherein the bumper bracket is composed of press-hardened steel.

12. The bumper system of claim 1, wherein at least one of the bumper bracket and the deformation element is composed of a flexibly rolled steel material.

13. The bumper system of claim 1, further comprising a second deformation element connected to the bumper bracket, the deformation elements being substantially mirror-images of one another.

14. The bumper system of claim 1, wherein reinforcement zones are formed in regions of each undulation peak.

15. A bumper system for a vehicle, comprising:
a bumper bracket with an undulating cross-section such that the bumper bracket has a plurality of undulation troughs and a plurality of undulation peaks; and
a deformation element connected to the bumper bracket; wherein reinforcement zones are formed in each undulation trough, each reinforcement zone increasing a diameter of the respective undulation trough along a convex side of the undulation trough.

16. A bumper system for a vehicle, comprising:
a bumper bracket composed of a metallic workpiece with an undulating cross-section such that the bumper bracket has at least one undulation trough and at least two undulation peaks; and
a deformation element connected to the bumper bracket; wherein a reinforcement zone is formed in a region of the undulation trough, the reinforcement zone increasing a diameter of the undulation trough along a convex side of the undulation trough.

17. The bumper system of claim 16, wherein:
the bumper bracket has a second undulation trough and a third undulation peak; and
a second reinforcement zone is formed in a region of the second undulation trough, the second reinforcement zone increasing a diameter of the second undulation trough along a convex side of the second undulation trough.

18. The bumper system of claim 17, wherein a third reinforcement zone is formed in the second undulation trough, the third reinforcement zone increasing a diameter of the second undulation trough along a convex side of the second undulation trough.

19. The bumper system of claim 16, wherein the reinforcement zone is stamped in the region of the undulation trough.

20. A bumper system for a vehicle, the bumper system comprising a bumper bracket connected to a deformation element, the bumper bracket comprising a metallic workpiece with an undulating cross-section such that the bumper bracket has an undulation trough and two undulation peaks, the undulation trough having a concave side and a convex side, and wherein:

a first length of the undulation trough is unreinforced by embossment or stamping; and a second length of the undulation trough is reinforced by embossment or stamping, the diameter along the undulation trough convex side being increased at the second length compared to at the first length due to the embossment or stamping.

\* \* \* \* \*